United States Patent [19]
Reinhold

[11] 3,903,150
[45] Sept. 2, 1975

[54] PROCESS FOR PREPARING 3-FLUORO-D-ALANINE

[75] Inventor: Donald F. Reinhold, North Plainfield, N.J.

[73] Assignee: Merck & Co., Inc., Rahway, N.J.

[22] Filed: Feb. 3, 1972

[21] Appl. No.: 223,340

[52] U.S. Cl..... 260/534 C; 260/326.11; 260/465 D; 260/465 E; 260/566 R; 424/319
[51] Int. Cl........................ C07c 99/00; C07c 99/10
[58] Field of Search....... 260/534 C, 534 R, 326.11, 260/465 D, 465 E

[56] References Cited
OTHER PUBLICATIONS
Cocker et al., J. Chem. Soc., (1931), pp. 1391–1402.
Wagner Zook, Syn. Org. Chem., 1953, p. 665.
Migrdichian, Org. Syn., 1957, p. 278.

*Primary Examiner*—Vivian Garner
*Attorney, Agent, or Firm*—J. Jerome Behan; Henry H. Bassford, Jr.

[57] ABSTRACT

3-Fluoro-D-analine is prepared by an asymmetric synthesis wherein fluoroacetaldehyde is reacted with D-optically active amine, such as D-α-methylbenzylamine to form the corresponding acetaldimine, which is reacted with hydrogen cyanide to form D-2-(D-α-methylbenzylamino)-3-fluoropropionitrile, followed by hydrolysis of the nitrile and hydrogenolysis of the methylbenzyl group. Other D-optically active amines such as R(D)-phenylglycine and 1-amino-(S)-2-[(R)-1-hydroxyethyl]indoline may be employed in the above process in place of the D-α-methyl-benzyl amine. The 3-fluoro-D-alanine thus obtained is a potent antibacterial agent.

4 Claims, No Drawings

PROCESS FOR PREPARING 3-FLUORO-D-ALANINE

This invention is concerned generally with the production of 3-Fluoro-D-alanine and its pharmacologically acceptable salts which are potent antibacterial agents valuable in inhibiting the growth of pathogenic bacteria of both the grampositive and gram-negative type. More particularly, it relates to the preparation of 3-fluoro-D-alanine compounds by asymmetric synthesis wherein fluoroacetaldehyde is reacted with a D-optically active amine such as D-α-methylbenzyl amine to form the corresponding acetaldimine which is reacted with hydrogen cyanide to form D-N-(D-α-methylbenzylimino)-3-fluoro-propionitrile which is reacted with an aqueous acidic hydrolyzing agent thereby hydrolyzing the nitrile and forming the corresponding salt of N-(D-α-methylbenzyl)-3-fluoro-D-alanine, followed by hydrogenolysis of the methylbenzyl group to form 3-fluoro-D-alanine.

In accordance with the present invention a D-optically active amine compound, such as D-α-methylbenzylamine, R(D)-phenylglycine, 1-amino-(S)-2-[(R)-1-hydroxyethyl] indoline and the like, is reacted with fluoroacetaldehyde, preferably by bringing the reactants together at a temperature below 0°C., anhydrous calcium sulfate is added, and the reaction mixture (where D-α-methylbenzylamine is used as a reactant) is allowed to warm to about room temperature, under which conditions the reaction is substantially complete in about 15 hours. The resulting acetaldimine, such as N-(D-α-methylbenzyl)-β-fluoroacetaldimine, N-(D-α-carboxybenzyl)-β-fluoroacetaldimine, and the like, is then reacted with hydrogen cyanide, which reaction is conveniently conducted by bringing the reactants together in solution in a lower alkanol such as ethanol at a temperature below about 0°C., preferably about −10°C.; the temperature of the reaction mixture is then raised to about 25°C. and the mixture is stirred for a period of about 15–20 hours at the end of which time the reaction is substantially complete to form 2-(D-α-methylbenzylamino)-3-fluoropropionitrile 2-(D-α-carboxybenzylamino)-3-fluoropropionitrile, and the like. This N-substituted-2-amino-3-fluoropropionitrile is then reacted with an aqueous mineral acid such as concentrated aqueous hydrochloric acid, preferably by heating the reactants together under reflux under which conditions the hydrolysis of the nitrile is ordinarily substantially complete in about 8 hours. The resulting N-(D-α-methylbenzyl or D-α-carboxybenzyl)-3-fluoro-D-alanine hydrochloride is conveniently liberated from the hydrochloride salt by treatment with propylene oxide.

A solution of this N-(D-α-methylbenzyl or D-α-carboxybenzyl)-3-fluoro-D-alanine in aqueous ethanol is then reacted with hydrogen at elevated pressure, e.g., 40 psi, using a hydrogenation catalyst such as palladium hydroxide-on-charcoal catalyst, thereby hydrogenolyzing the N-substituent. After hydrogen uptake ceases, the catalyst is filtered, the filtrate is evaporated to dryness in vacuo, and the residual material is recrystallized from aqueous isopropanol to give 3-fluoro-D-alanine.

The following examples illustrate methods of carrying out the present invention, but it is to be understood that these examples are given for purposes of illustration and not of limitation.

EXAMPLE 1

About 12.4 g of freshly prepared fluoroacetaldehyde is slowly distilled into 24.3 g of D(+) ) α-methylbenzylamine which is cooled in an ice-methanol bath. About 50 g of anhydrous calcium sulfate is slowly added to the mixture, and the resulting mixture is stirred overnight at room temperature. About 200 ml of ether is added, and the calcium sulfate separated by filtration. The ether filtrate is then evaporated in vacuo, the residual N-(D-α-methylbenzyl)-β-fluoroacetaldimine is dissolved in anhydrous ethanol, the ethanolic solution is cooled to −10°C., and about 7.9 ml of hydrogen cyanide is added. The resulting mixture is stirred at room temperature for about 16 hours, and the ethanol is evaporated in vacuo to give 2-(D-α-methylbenzylamino)-3-fluoro-D-propionitrile. About 200 ml of cold concentrated aqueous hydrochloric acid solution is added to the chilled residual nitrile, the mixture is stirred overnight at room temperature, then heated at reflux temperature for 8 hours, and the reaction solution is evaporated to dryness in vacuo. The excess hydrochloric acid is removed from the residual material by adding 100 ml of t-butanol and evaporating to dryness to give the hydrochloride salt of N-(D-α-methylbenzyl)-3-fluoro-D-alanine. The latter salt is dissolved in absolute ethanol, the solution is filtered, and 16 ml of propylene oxide is added to liberate the amino acid from its hydrochloride salt; the mixture is allowed to stand at room temperature overnight to complete the reaction to form N-(D-α-methylbenzyl)-3-fluoro-D-alanine, which is recovered by filtration, washed with ethanol, and recrystallized from aqueous ethanol.

The N-(D-α-methylbenzyl)-3-fluoro-D-alanine is dissolved in ethanol containing an equivalent of hydrogen chloride and is hydrogenolyzed at 40 psi with 10% palladium hydroxide on charcoal catalyst, thereby cleaving the α-methylbenzyl grouping; the catalyst is filtered, and the filtrate evaporated to dryness to give 3-fluoro-D-alanine hydrochloride. This residual hydrochloride salt is dissolved in a minimum of water, and the pH is adjusted to 4.8 with concentrated aqueous ammonium hydroxide. The resulting mixture is cooled to 0°C., and optically pure 3-fluoro-D-alanine is separated therefrom by filtration.

Alternatively, the hydrochloride salt of 3-fluoro-D-alanine is dissolved in water and is passed through a strong-acid cation-exchange resin (H$^+$cycle). The column is washed with water to remove the chloride ions, and the column is eluted with dilute aqueous ammonium hydroxide. Upon evaporation of the eluate, a precipitate forms which is recovered by filtration and dried to give the 3-fluoro-D-alanine.

Various changes and modifications may be made in carrying out the present invention without departing from the spirit and scope thereof. Insofar as these changes and modifications are within the purview of the annexed claims, they are to be considered as part of this invention.

What is claimed is:

1. The process which comprises reacting fluoroacetaldehyde with an optically active primary D-amino compound selected from the group consisting of R(D)-phenylglycine, D-α-methylbenzylamine and 1-amino-(S)-2-[(R)-1-hydroxyethyl]indoline, at below 0°C. to 25°C., thereby forming the corresponding acetaldimine, reacting the latter with hydrogen cyanide at −10°C. to 25°C. to form the corresponding N-substituted-D-2-amino-3-fluoro-propionitrile, reacting the latter with an aqueous mineral acid thereby hydrolyzing the nitrile to form the corresponding N-substituted 3-fluoro-D-alanine, and catalytically hydrogenating this N-substituted 3-fluoro-D-alanine, thereby hydrogenolyzing the N-substituent to form 3-fluoro-D-alanine.

2. The process as defined in claim 1 wherein fluoroacetaldehyde is reacted with R(D)-phenylglycine to form 2-(D-α-carboxybenzyl)-3-fluoro-acetaldimine, the latter is reacted with hydrogen cyanide to form 2-(D-α-carboxybenzylamino)-3-fluoro-propionitrile, this last compound is heated with concentrated aqueous hydrochloric acid thereby hydrolyzing the nitrile to form N-(D-α-carboxybenzyl)-3-fluoro-D-alanine hydrochloride, and this N-(D-α-carboxybenzyl)-derivative is reacted with hydrogen in the presence of palladium hydroxide-on-charcoal-catalyst thereby hydrogenolyzing the carboxybenzyl substituent to form 3-fluoro-D-alanine.

3. The process as defined in claim 1 wherein the optically active D-amino compound reacted with fluoroacetaldehyde is 1-amino-(S)-2-[(R)-1-hydroxyethyl] indoline.

4. The process as defined in claim 1 wherein fluoroacetaldehyde is reacted with D-α-methylbenzylamine to form 2-(D-α-methylbenzyl)-3-fluoro-acetaldimine, the latter is reacted with hydrogen cyanide to form 2-(D-α-methylbenzylamino)-3-fluoro-propionitrile, this last compound is heated with concentrated aqueous hydrochloric acid, thereby hydrolyzing the nitrile to form N-(D-α-methylbenzyl)-3-fluoro-D-alanine hydrochloride, and this N-(D-α-methylbenzyl)-derivative is reacted with hydrogen in the presence of palladium hydroxide-on-charcoal catalyst, thereby hydrogenolyzing the methylbenzyl substituent to form 3-fluoro-D-alanine.

* * * * *